May 26, 1925.
J. A. HALL
STONE SAW
Filed Sept. 4, 1923
1,539,259
Fig. 1.
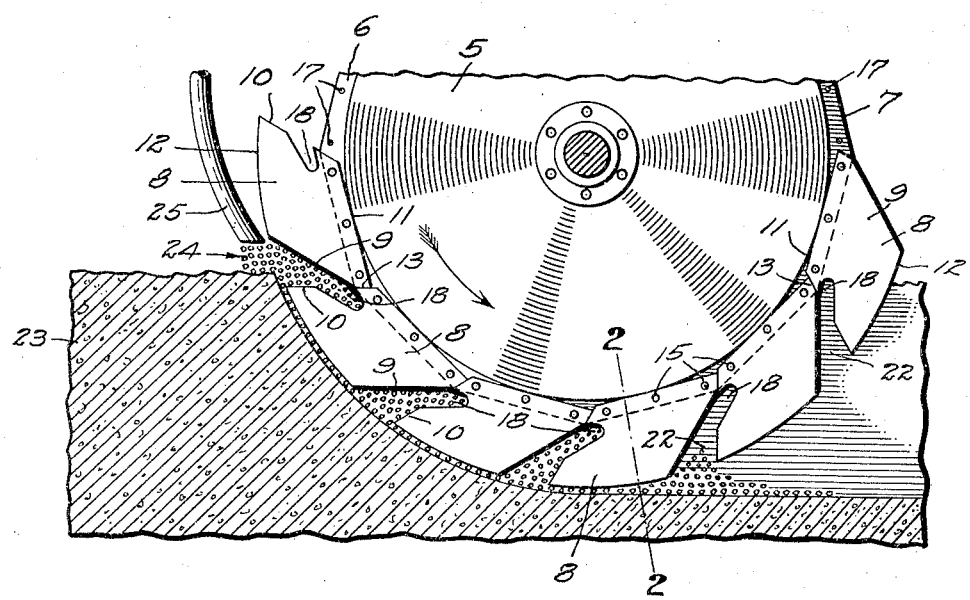
Fig. 2.
Fig. 3.
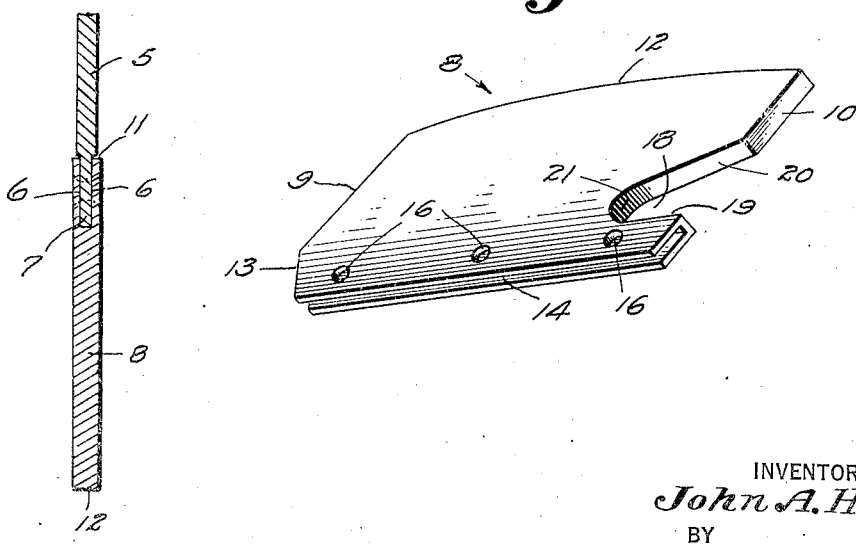
INVENTOR
John A. Hall
BY
ATTORNEY Patented May 26, 1925.

1,539,259

UNITED STATES PATENT OFFICE.

JOHN A. HALL, OF SEATTLE, WASHINGTON, ASSIGNOR TO PARKER ROTARY STONE SAW COMPANY, OF SAN FRANCISCO, CALIFORNIA, A CORPORATION OF NEVADA.

STONE SAW.

Application filed September 4, 1923. Serial No. 660,919.

*To all whom it may concern:*

Be it known that I, JOHN A. HALL, a citizen of the United States, residing at Seattle, in the county of King and State of Washington, have invented certain new and useful Improvements in Stone Saws, of which the following is a specification.

This invention relates to stone-saws, and more particularly to improvements in the saw-teeth of the character illustrated and described in U. S. Patent No. 1,293,897 issued February 11, 1919.

The object of my invention is to improve the saw teeth in order to perfect the cutting operation, of the saw by affording a better action of the abrasive shot with respect to the saw and the work.

Other objects and advantages of the invention will appear in the following specification.

The invention consists in the novel construction or form of a saw tooth hereinafter described and claimed.

In the accompanying drawing,—

Figure 1 is a side elevation of a portion of a stone-saw having teeth embodying my improvements. Fig. 2 is a sectional view on line 2—2 of Fig. 1. Fig. 3 is a perspective view of a saw tooth shown detached.

In said drawing, the reference numeral 5 designates a saw-blade of a circular or polygonal shape and adjacent to its periphery is desirably machined to provide two parallel surfaces 6 at opposite sides of a rib 7 extending circumferentially about the blade.

Provided for said blade is a plurality of detachable saw teeth 8 each of a greater thickness than the thickness of the blade. A saw tooth is of a substantially rhomboidal shape with its front edge 9 and its rear edge 10 substantially parallel with each other but out of rectangular relations with respect to both the inner edge 11 and the outer edge 12 of the tooth.

The outer edge 12 of a tooth is desirably formed to an arc which will be concentric to the saw axis when the tooth is applied. The angle between the front and inner edges 9 and 11, respectively, of a tooth is cut away to provide an edge 13 which is arranged to abut throughout its length with the rear edge 10 of the saw tooth next in front.

A saw tooth is provided at its inner side with a longitudinal groove 14 of a width to fit over the blade rib 7 and of a depth, preferably, equal to the width of said rib radially of the saw-blade. The teeth are secured to the blade by means of rivets 15 extending through registering holes 16 and 17 provided in the teeth and blade rib, respectively.

The holes 16 of the teeth are made somewhat conoidal to receive the headed portions of the rivets whose outer ends are flush or in a plane with the side faces of the respective teeth.

The front edges 9 of the respective teeth are disposed in angular relations of approximately 90° with lines projected radially of the saw axis through the respective front edges.

The stone-saw comprising the blade and the teeth so far described is similar to those illustrated and described in the patent above referred to.

According to the present invention, each of the saw teeth 8 is formed or cut away to provide a recess or pocket 18 in its rear side.

As shown, said pocket is formed to provide an inner wall 19 parallel or nearly so with the inner edge 11 of the respective tooth, said inner wall being connected by a curved wall portion 21 with an outer wall 20 which is arranged to be approximately parallel with the opposing front edge 9 of the adjacent saw tooth to the rear.

The pockets 18 constitute extensions of the saw gullets 22 which obtain between the adjoining teeth. Such pockets or extensions by being formed in the rear sides of the teeth afford as long bearing and blade engaging portions to the teeth as possible.

For cutting a stone, as 23, Fig. 1, an abrasive material such as shot, indicated by 24, is supplied from a feed nozzle 25 into the path of the saw and is carried by the latter into the kerf cut into the stone.

In operation, the saw teeth 8 are revolved in the direction denoted by the arrow in Fig. 1 and by the shape of the teeth the shot is carried therewith principally in the gullets 22 and pockets 18 whence the shot is carried by the relatively inclined tooth edges 9 into the interstice between the peripheral saw line of the teeth and the opposing surface of the kerf in the stone. In actual work, however, without the use of the pockets or extensions 18 to the gullets 22 the bays or courses of the shot are too restricted and of unsuitable shapes to afford free passages for the delivery of the shot, especially after the outer portions of the teeth have been worn away.

The advantages of the invention reside in the better distribution of the shot in the kerf made in cutting, in the lessening in liability of the saw sticking, and in the prolonging of the usefulness of the saw teeth.

What I claim, is—

1. A saw-tooth for a circular stone saw, said tooth being of a general rhomboidal shape with the front and rear edges thereof in substantially parallel relations with each other, said rear edge having a re-entrant angular pocket therein.

2. A saw-tooth for a circular stone saw, said tooth being of a general rhomboidal shape with the front and rear edges thereof in substantially parallel relations with each other, said rear edge having a re-entrant angular pocket therein, and a groove extending the entire length of the tooth provided in the inner side of the same.

3. A saw-tooth for a circular saw, said tooth having an arcuate outer edge and substantially parallel front and rear edges, said front edge being straight and the rear edge being formed with a re-entrant angular shaped recess.

4. In a circular stone saw, the combination with a saw-blade, of a plurality of bifurcated teeth adapted to straddle the saw-blade and secured thereto by rivets, said saw teeth each being of a general rhomboidal shape with front and rear edges inclined from lines radially of the saw, to afford gullets between the adjoining teeth, said teeth each being formed in its rear side with a recess which constitutes an extension to the respective gullet.

Signed at Seattle, Washington, this 13th day of August, 1923.

JOHN A. HALL.

Witnesses:
 PIERRE BARNES,
 M. G. SUPPLE.